March 15, 1966   H. E. YOUNG ETAL   3,240,413
CABLE GUIDE AND RETRIEVAL MECHANISM
Filed June 7, 1962   3 Sheets-Sheet 1
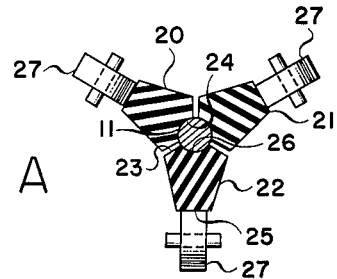
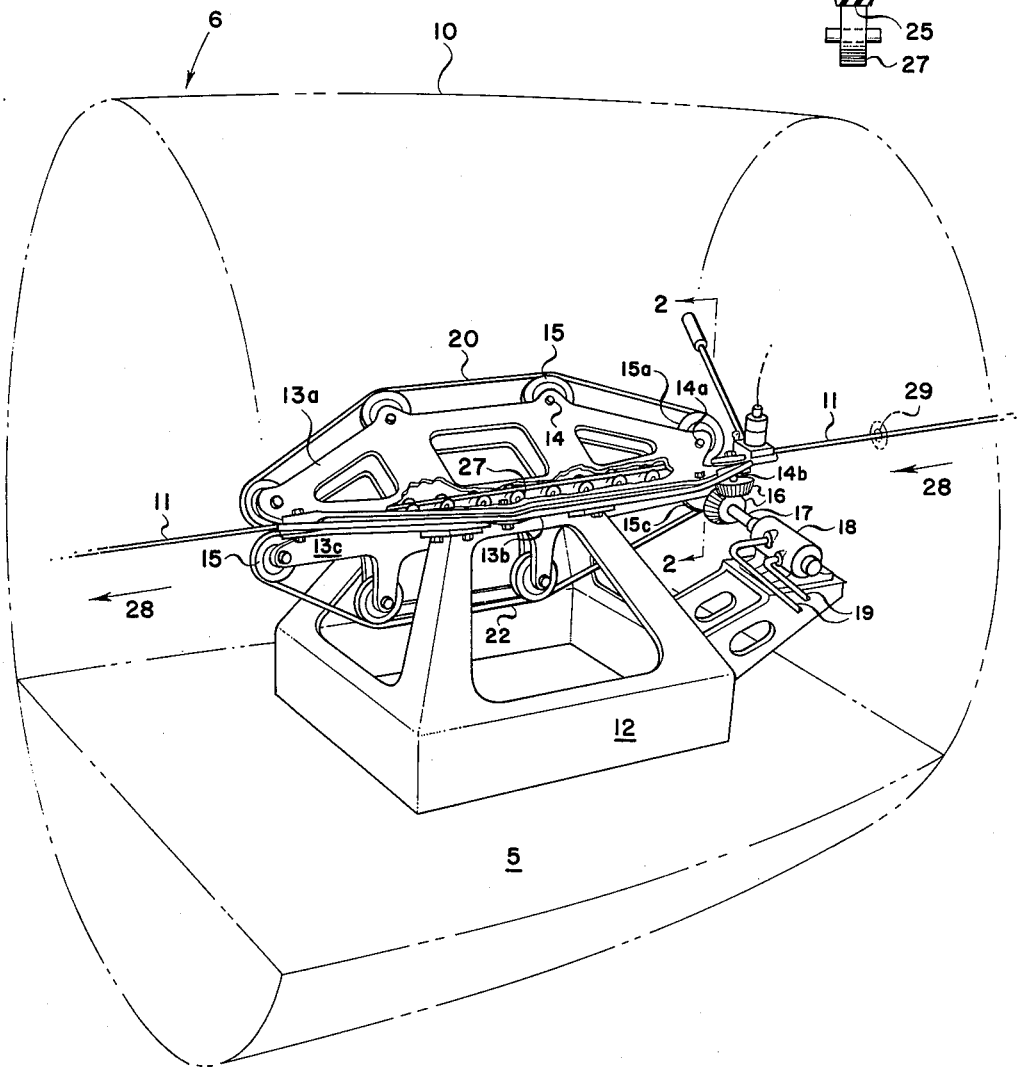
FIG. 1
INVENTORS.
HAROLD E. YOUNG
FRANK S. MEISTER
BY
Agent

INVENTORS.
HAROLD E. YOUNG
FRANK S. MEISTER

United States Patent Office 3,240,413
Patented Mar. 15, 1966

3,240,413
CABLE GUIDE AND RETRIEVAL MECHANISM
Harold E. Young, Van Nuys, and Frank S. Meister, Canoga Park, Calif., assignors to Lockheed Aircraft Corporation, Burbank, Calif.
Filed June 7, 1962, Ser. No. 202,348
3 Claims. (Cl. 226—172)

This invention relates to cable pulling mechanisms and more particularly to a novel cable retrieval and guide system for extremely long cables trailing behind an aircraft.

In a very low frequency transmitting system in an aircraft employing an extremely long antenna wire or cable dragging from the aircraft in flight, the retrieval of such a cable when it is being reeled-in presents problems in the prevention of deformation of the cable. The drag upon the cable if not relieved will deform the cable against the drum upon which it is being reeled-in.

A somewhat similar problem exists upon release of the wire when reeling it out but this does not present the same difficulty since the unwinding wire on being reeled out is moving in the same direction as the backward drag.

An example of the type of antenna wire or cable which in use present the severe reel-in drag problem is set forth in the copending application of Harold Held, Serial No. 193,630 filed May 9, 1962, entitled Airborne Very Low Frequency Radiator, and assigned to the same assignee as the present invention.

To relieve the strain upon the cable during the retrieval thereof a novel guiding and retrieval mechanism has been devised.

This new guide and retrieval system employs three continuous V-belts arrayed in a supporting structure on axes 120° apart. The outer surface of each belt is configured and grooved so that when all three come together in accordance with this invention they form a long continuously moving tube which grabs the cable and draws it into the reeling mechanism associated therewith. The gripping action of the moving tube is similar in principle to the oriental finger grip.

Accordingly it is an object of this invention to provide a retrieval and guiding means for a long cable under a normally heavy dragging strain, said retrieval and guiding means relieving the strain to prevent deformation of the wire during retrieval thereof.

It is another object of this invention to provide a guide and retrieval means for extremely long cables wherein a long continuously moving tube is formed to pull continuously upon the cable during retrieval thereof so as to evenly distribute the pull-in strain over the length of cable within the moving tube and thereby relieve the strain on the cable which would otherwise result to deform the cable during the reeling of the cable onto a drum.

It is still another object of the invention to provide a novel continuously acting retrieval and guide mechanism for pulling upon cables of great length, normally under a severe drag opposite in direction to the retrieval pull so as to relieve the strain of said drag upon the cable and prevent its deformation.

It is still a further object of the invention to provide in a cable retrieval mechanism hydraulic means for driving the mechanism coupled with a cable drum reeling mechanism so as to vary the reeling-in rate and rate of pull upon the cable to accommodate variations in air speed and drag factors.

These and other objects of the invention will become more clear from the specification which follows and the appended claims taken together with the figures in which:

FIGURE 1 shows an overall view of the retrieval and guide mechanism according to this invention;

Figure 2:
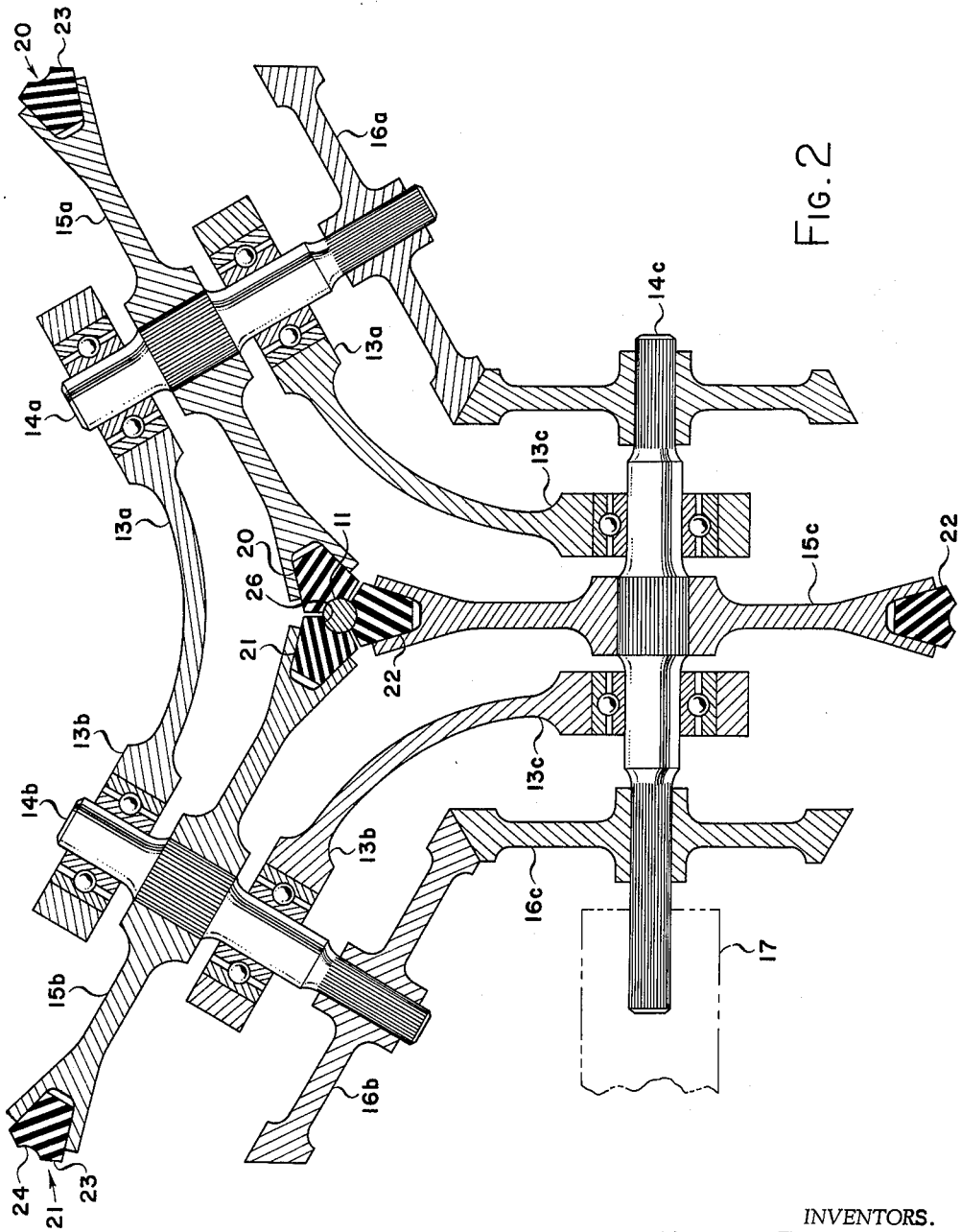
FIGURE 2 is a detailed cross-section of the mechanism shown in FIGURE 1 through 2—2 thereof.

In FIGURE 1 to which reference is now being made, the same numerical character references are applied to the parts which are also shown in FIGURE 2. The description below should be taken with reference to both figures.

Figure 3:
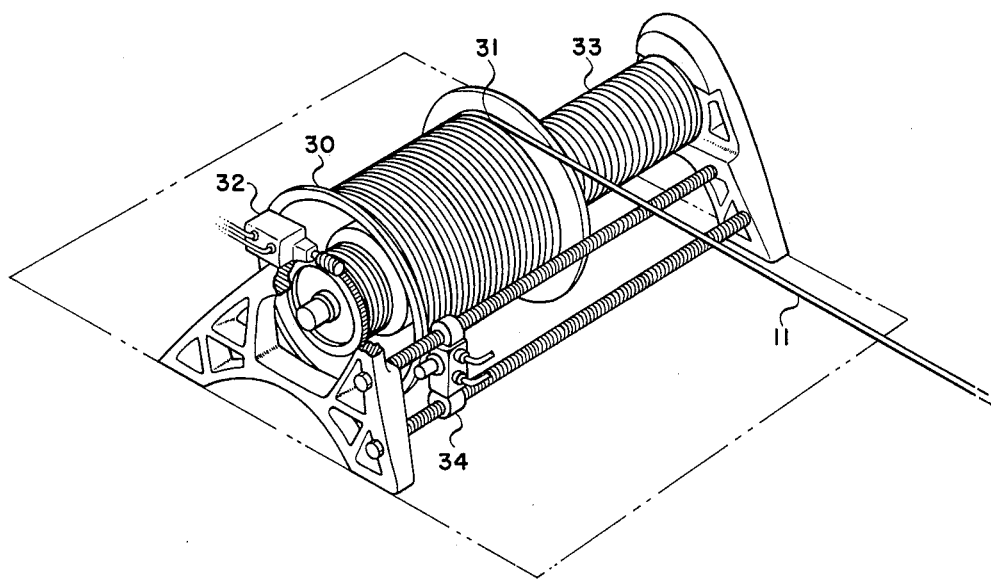
FIGURE 3 is a representative reeling mechanism of a type which may be used in conjunction with the invention.

Within the tail section 10 of an aircraft 6 there may be combined a reeling-in mechanism such as shown in FIGURE 3 or any other similar device suitable for the purpose. From the reeling-in mechanism an antenna cable 11 is reeled out or reeled back on again when the reeled-out cable 11 is retrieved. As has been previously described, if not otherwise provided for, a coaxial cable or the like may be deformed by the drag during reeling-in. This is more so on reeling-in than when the cable is being reeled-out. It is the purpose of the device shown in FIGURES 1, and 2 to prevent the above-mentioned deformation. A base frame 12 is mounted on the floor 5 of the tail section 10 of the aircraft 6. A generally Y-shaped frame 13 includes leg sections 13a, 13b and 13c and is supported on frame 12. Each leg of the Y is separated from its adjacent leg by an angle of 120°. The Y section 13b is cutaway to reveal internal structures therein. On each of the legs 13a–13c V-grooved pulleys 15 are mounted for free rotation on axles 14. At one end of each leg of the Y where the axles and pulleys are identified as 14a through 14c and 15a through 15c respectively, gearing means 16 includes gears 16a through 16c which are operatively coupled to the axles 14a through 14c, respectively, and to a shaft 17 of a hydraulic motor 18 supplied from the aircraft hydraulic system through hydraulic piping at 19.

It may be seen that the gearing means or mechanism 16 is actuated by shaft 17 to drive the series of beveled gears 16a, 16b, 16c which are respectively coupled to each, of the the belt drive systems for endless V-belts 20, 21, 22.

As shown in the cross-section of each belt 20, 21, 22 of FIGURE 2 the belts are shaped in the general form of a V-belt with beveled corners 23, each belt having an arcuate contour 24 in the widest (outer) surface thereof and being flat as at 25 in the narrowest (inner) surface thereof. In FIGURE 2 the three belts 20, 21, 22 are shown as they come together in the central path of the mechanism. The three belts 20, 21, 22 surround cable 11 passing through the aperture 26 formed by contours 24 of the three belts as they pass through the central path. A series of guide and pressure wheels 27 are positioned on each leg of the Y structure along the central path supporting endless belts 20, 21, 22 in the center to form guide and pressure paths along the common central path traversed by the three belts 20, 21, 22. The structure 13b has been cut away as shown in FIGURE 1 to reveal the belt guide and pressure wheels 27.

From FIGURES 1 and 2, it may be seen therefore that three endless belts 20, 21, 22, trained over a series of pulleys 15 rotatably journaled on axles 14 and driven by a hydraulic motor 18 through shaft 17 and gears 16a, 16b and 16c which turn pulleys 15a, 15b and 15c respectively, on axles 14a, 14b and 14c (and thereby belts 20, 21, 22) are arranged on the supporting structures 12 and 13 so that each belt runs in a path in a plane 120° apart from the path of the other two belts. All three belts come together at the junction of the three planes and all three move together in the same direction at this junction as may be seen at aperture 26 at the center of FIGURE 2. The contour of each of the belts 20, 21, 22 is such that where the three legs of the Y come together the movement and proximity of the three belts about a cable 11 passing therethrough form a continuously moving tube at aperture 26. A series of guide and pressure wheels 27 freely rotatable and mounted along the central junction of each of the 120° planes provide pressure against the three cables 20, 21, 22 as seen in inset A of FIGURE 1 to force the aperture 26 formed by the three belts to press against cable 11 thereby to pull cable 11 along as belt 20, 21, 22 move in the direction of arrow 28 (FIGURE 1).

Thus, all of the pull against cable 11 when drawing it into the aircraft through the aperture 29 from the outside is in the long path of the belts 20, 21, 22 formed as at aperture 26 in inset A of FIGURE 1. This path for a cable such as 11, ½ inch in diameter, may be 6 feet long.

As cable 11 is then drawn onto reel 30 shown in FIGURE 3 no deformation pressure is applied against the cable at the point at which the cable reels onto reel 30 as shown at 31. A motor 32 drives a jack screw 33 which is used for oscillating the reel 30 back and forth much in the same manner as a conventional level wind fishing reel. A second hydraulic motor 34 drives the reel 30 to wind the cable 11 upon the reel and the motor is oscillated back and forth at the same rate as the reel in a conventional manner.

There has been described above a means for retrieving long cables under a drag stress whereby the stress is relieved. While herein specifically described as directed to a long antenna cable in an aircraft the mechanism may be also used as a cable puller for any types of cables.

The mechanism of this invention utilizes a continuously moving belt arrangement in which the array of moving belts are so configured as to form a moving tube which grips the cable to pull it into the vehicle in which the mechanism is carried and feed the cable to a reeling-in mechanism without strain on the cable being reeled-in.

What is claimed as new is:
1. A cable guiding and retrieving means comprising:
 (a) a base support structure;
 (b) a triaxial frame bolted to said support structure, each of the axes of said frame being radially arrayed from a common central locus;
 (c) pulley means journalled in each of the axes of said frame;
 (d) an endless belt trained over said pulleys respectively in each of said axes of said frame, the outer surface of each of said belts being concave and forming an aperture where said belts pass in common through said locus, said aperture substantially encompassing said cable and conforming in shape to the cross-sectional shape of said cable; and
 (e) drive means geared to said pulley means to drive each of said endless belts continuously and synchronously through said locus as a continuously moving aperture, whereby when a cable is passed through said aperture said cable is drawn continuous through said guiding and retrieving means by the continuous movement thereof.

2. A cable guiding and retrieving means comprising:
 (a) a cable spooling mechanism;
 (b) a base support structure;
 (c) a triaxial frame bolted to said support structure, each of the axes of said frame being radially arrayed from a common central locus;
 (d) pulley means journalled in each of the axes of said frame;
 (e) an endless belt trained over said pulleys respectively in each of said axes of said frame, the outer surface of each of said belts being concave and forming an aperture where said belts pass in common through said locus, said aperture encompassing said cable and conforming in shape and size to the cross-sectional shape and size of said cable; and
 (f) drive means geared to said pulley means to drive each of said endless belts continuously and synchronously through said locus to form a continuously moving aperture, whereby when a cable from an external source is passed through said aperture to said spooling mechanism, said cable is drawn continuously through said guiding and retrieving means by the continuous movement thereof onto said spooling mechanism without undue pressure on said cable.

3. Apparatus for reeling a cable into the tail section of an aircraft against the backward drag imparted to said cable by the forward motion of said aircraft, comprising:
 a base frame mounted in said tail section, said base frame having upstanding members;
 a Y-shaped frame supported on said base frame, said Y-shaped frame having legs separated by an angle of approximately 120°, and of said legs depending into said base frame intermediate its upstanding members, each of said legs including a pair of side walls;
 a set of axles rotatably mounted on each of said legs between said side walls;
 a pulley keyed to each axle for rotation therewith, said pulleys extending into said Y-shaped frame to a point adjacent a common central locus;
 an endless belt trained over each set of said pulleys and forming a tube having a longitudinal axis corresponding to said locus, the outer contours of said belt forming a side wall for said tube having a cross-sectional shape conforming to the cross-sectional shape of said cable, whereby said tube substantially encompasses said cable, said side wall being transversely uninterrupted throughout its length;
 first and second gears keyed to one of the axles on said depending legs;
 third and fourth gears keyed to one of the axles on the other legs of said Y-shaped frame, said first gear engaging said third gear and said second gear engaging said fourth gear; and
 drive means connected to said one axle on said depending legs for driving said belts through said gears.

References Cited by the Examiner

UNITED STATES PATENTS

| | | | |
|---|---|---|---|
| 1,282,788 | 10/1918 | Fenn | 226—172 |
| 1,670,337 | 5/1928 | Brackett | 226—172 X |
| 1,813,197 | 7/1931 | Reichelt | 57—58.52 X |
| 2,080,635 | 5/1937 | Schramek et al. | 226—172 X |
| 2,251,291 | 8/1941 | Reichelt | 226—172 |
| 2,647,699 | 8/1953 | Bush | 242—54 |
| 2,709,000 | 5/1955 | Frank et al. | 226—172 |
| 2,797,798 | 7/1957 | Hallden | 226—172 |
| 2,915,171 | 12/1959 | Peck | 226—172 |
| 2,935,178 | 5/1960 | Lutcke | 226—172 |
| 3,022,928 | 2/1962 | Ulmitz | 226—172 |
| 3,024,956 | 3/1962 | Gretter | 226—172 X |

FOREIGN PATENTS 1,103,496   5/1955   France.

MERVIN STEIN, *Primary Examiner.*

ARTHUR M. HORTON, SAMUEL FEINBERG,
*Examiners.*